March 17, 1936.  C. F. BECKWITH ET AL  2,034,370
LIQUID SUPPLY SYSTEM
Filed Nov. 6, 1928
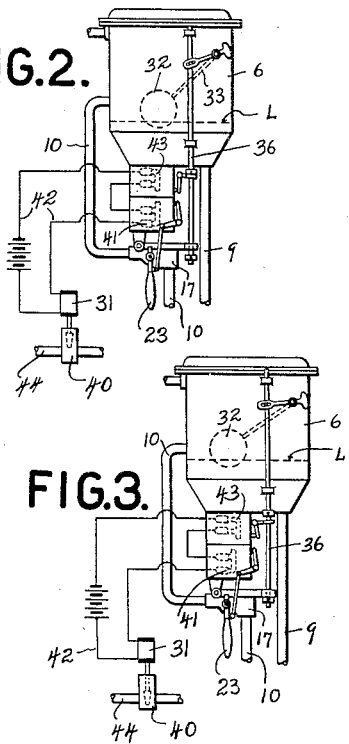
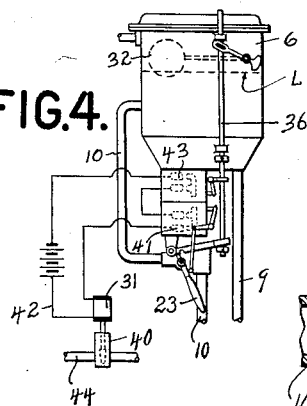
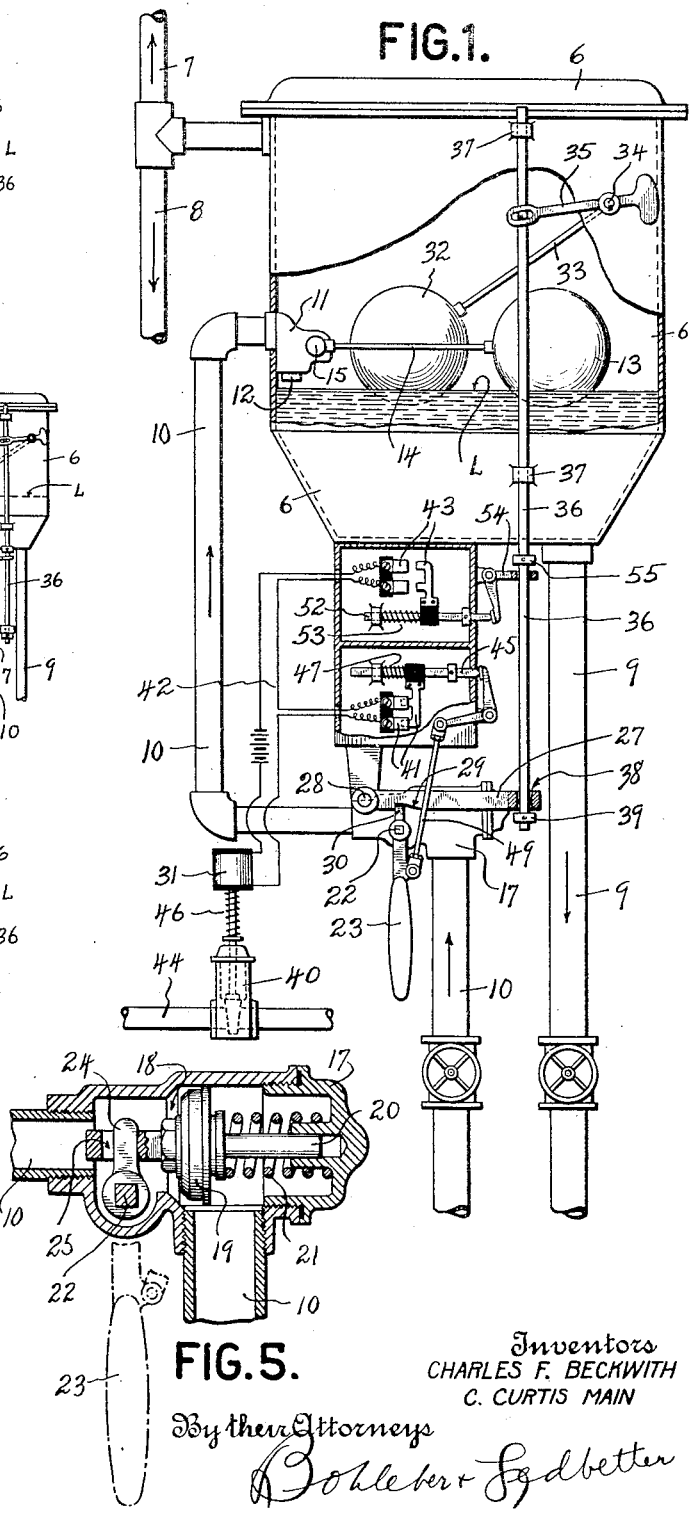
Inventors
CHARLES F. BECKWITH
C. CURTIS MAIN
By their Attorneys
Bohleber & Ledbetter Patented Mar. 17, 1936

2,034,370

UNITED STATES PATENT OFFICE 2,034,370

LIQUID SUPPLY SYSTEM

Charles F. Beckwith, Flushing, and Charles Curtis Main, Piermont, N. Y., assignors, by direct and mesne assignments, to Aqua Systems Incorporated, New York, N. Y., a corporation of New York Application November 6, 1928, Serial No. 317,549

10 Claims. (Cl. 137—68)

This invention relates to liquid dispensing or supply systems, especially to gasoline, oil or other fuel dispensing or supply systems for feeding gasoline to motor vehicles, and more particularly for feeding gasoline to one or a large number of internal combustion engines running on test.

A main object of the invention is to produce improvements in electrically controlled means for liquid supply apparatus to safeguard the operation thereof, and to this end an electric circuit is positively opened to break the circuit which electrically actuates a remotely-located valve means which in turn stops and starts the flow of liquid or gasoline from a source of supply to the apparatus, and the latter then feeds the gasoline to the engine or engines as needed.

In the mass production of internal combustion motors, it is necessary to run-in and test the engines on a large scale. This test work is carried out on one or more and usually a varying and large number of engines which are simultaneously operating. It is necessary, therefore, that an efficient gasoline supply system be provided, one which will feed one or more engines and never fail to positively supply gasoline to the carburetors of the engines on test despite the fact that the rate of consumption may vary to a large extent due to the varying number of engines in operation.

A further object is to produce a gasoline supply apparatus or system having positively-actuated means which controls an electric circuit by working one, two or more switches, which are under the control of the hydrostatic head of liquid in the apparatus, and wherein the operation of one, two or more valves is coordinated with the switches.

The accompanying drawing shows an example of the invention and it is to be understood that changes may be made without departing from the principle involved.

Figure 1 shows a side view of the apparatus in partial vertical section and the position of parts is that of normal-operating-liquid level. One of the switches is open which means that the liquid flow to the apparatus has been shut off from the source of supply by a remotely-controlled valve or other means because the liquid has reached a normally-high-operating level.

Figures 2, 3 and 4 show diagrams of the various operating positions of the parts brought about by varying levels of the liquid in the receiving chamber. Figures 2 and 3 show, respectively, normally-low and normally-high operating liquid levels as ordinarily attained by the liquid during the consumption and flow thereof from the chamber. Figure 4 shows the liquid at abnormal height with the parts in position to positively stop the flow of liquid to the receiving chamber.

Figure 5 shows a longitudinal section view of a power-actuated safety-cut-off valve in open position which permits liquid to flow therethru into the receiving chamber. This valve is a combination manual and power-operated valve designed to automatically close when the liquid reaches an abnormal height in the receiving chamber and adapted to be manually set to open position by an attendant when ready to again start the apparatus in operation.

In accordance with the principles of the invention, there is provided a receiving chamber with one or more floats to operate a valve or valves mounted in an inflow pipe connected to the receiving chamber. An electric circuit may be provided to stop and start the flow of liquid from the storage source not shown, to the liquid supply apparatus constituting this invention. Switches, in this instance two being shown, are included in the circuit and operating connections are established between the switches and one or more of the floats, the arrangement being such that when a switch is open, the liquid stops flowing from its storage source and when the switch is closed the liquid again starts flowing. A feature is the use of one of the switches as a normal-level-control switch to open and close during normal inflow and outflow of the liquid to maintain a normal-operating-liquid level, and also the use of another switch as a safety switch to automatically open in case the liquid level abnormally rises above the normal operating level.

The term normal-operating-liquid level, or normal-operating level simply means that desirable and predetermined height or level of the liquid in the receiving chamber at which the system should operate so that the chamber will never become emptied or overflow. There may be, of course, a variation in the normal-operating level, but that variation is within a limited range, as noted in Figures 2 and 3 which show, respectively, normal-operating level at its maximum low and high points, but such slight change as indicated in these two views is not considered a material change in liquid head and consequently these views show the operating or general working level from which is is desired not to vary.

Coming now to a more detailed description of one example of the invention, there is shown a receiving chamber 6 into which liquid to be dispensed is received from any suitable storage source not shown, but which frequently comprises an underground tank. A vent pipe 7 connects with the receiving chamber 6 and usually extends out through the roof of the building so as to vent the air and fumes from the receiving chamber thereby allowing a free inflow of liquid. Likewise a return pipe 8 may be connected with the chamber 6 and run back to the storage source. Should the chamber 6 for any cause abnormally overfill, the pipe 8 conveys excess liquid back to the storage source. The vent pipe 7 and return pipe 8 increase the safety of the apparatus. A discharge pipe 9 conveys liquid from the apparatus to the point of use not shown, say to engines being supplied with motor fuel.

An inflow pipe 10 leads from a storage source not shown and connects with the receiving chamber 6 and transmits gasoline thereto. Valve and switch means are included in the apparatus to first control or maintain the gasoline level L at a normal or desired predetermined operating level or head; and second, to positively cut off the inflow of gasoline to the chamber 6 in case the level L rises beyond the control of the normal-level-control means; and third, to cut off and relieve the pressure in the inflow pipe when either or both of said first and second named valve means are caused to close.

To the above ends a normal-level-control valve 11 is connected to the inflow pipe 10 and from the valve mouth 12 gasoline pours directly into the chamber 6 to uniformly and constantly maintain the liquid level L at a proper working level or hydrostatic head. Figures 1, 2 and 3 show the liquid level at substantially its normal working or operating height, although in Figures 1 and 3 the liquid level L has begun to recede so that shortly the apparatus will automaticaly function to refill the chamber 6 through the valve 11. A normal-level-control float 13 is connected by a rod 14 to the normal-level-control valve 11 by pivoting at 15 the float 13 on the valve 11. The valve 11 and float 13 thus provide a normal-level-control unit 11—13 because valve 11 gradually closes as the float 13 rises and gradually opens as the float 13 gravitates downwardly with the receding liquid.

The apparatus normally functions under the control unit 11—13 but in case a slight leak should develop in the valve 11, as caused by a grain of sediment, there is provided a safety valve means 17 for positively closing the inflow pipe 10 at a point between the normal-level-control valve 11 and the storage source. The safety valve 17 is mounted in the inflow pipe 10 and is shown open in all views except Figure 4. The valve 17 comprises any suitable form of power actuated valve where power means such as a weight, spring, or other means acts to automatically close the valve, and manual means is thereafter worked by an attendant to set the valve to open position. The valve housing 17 has a seat 18 and a neck to receive the pipe 10 on each side of the seat 18. A valve closure or disc 19 is fixed to a slidable stem 20, and a spring or other power or motor means 21 continuously urges the valve disc 19 toward the seat 18 to close the valve. It is therefore necessary to provide a positive latch or lock-open mechanism to hold the valve disc 19 open against the tension of the power means 21 so that gasoline may flow through the pipe 10 to the chamber 6.

Means for opening the valve 17 comprises a shaft 22 journalled in the valve housing 17 and a handle 23 or other means is anchored to the shaft 22. Within the housing 17 an arm 24 is fixed on the shaft 22 and this arm projects through a slot 25 made in the valve stem 20. By manually swinging the handle 23 clockwise, the valve disc 19 is opened and the spring 21 or other power-closing means is compressed or set to automatically close the valve when the liquid rises abnormally high and beyond the control of the float and valve unit 11—13. The safety valve 17 shown is by way of example and any suitable power-actuated valve may be used and it may be closed by motor, spring, weight or other means.

A lock-open mechanism is provided to hold the safety-valve handle 23 against the compressed spring 21 and hence to hold the valve 17 open. This locking mechanism may comprise a latch 27 pivoted at 28 on any stationary support. The latch 27 is made with a notch 29 to engage a catch arm 30 made on the upper end of the handle 23 or the arm 30 is otherwise fastened to the valve shaft 22. The weight of the latch 27, or a spring if desired, holds it down in engagement with the catch 30 so that the power means 21 of valve 17 is held under compression or to set-open position with the valve disc 19 open and backed off from the valve seat 18 so that gasoline normally flows through this safety valve which ordinarily remains open under normal working conditions. To start the apparatus in operation, the attendant swings the handle 23 to the left until the valve 17 is positively held open by latch 27. Only when the liquid level L rises beyond the control of the normal-level control unit 11—13 is the power actuated valve 17 called upon to function by automatically closing the inflow pipe 10.

A safety float 32 preferably rides on the gasoline surface L and is attached to a float rod 33 which is pivoted at 34 in the wall of the chamber 6. An arm 35 is fixed to the float pivot or shaft 34. The arm 35 is operatively connected with a switch and valve-control rod 36 movably confined in guides 37. The rod 36 has one end thereof operatively connected with the free end of the latch 27 as by slidably mounting the rod 36 in an eye 38 formed in the latch. Upward movement of the rod 36 brings a collar 39 fixed to the rod 36 against the latch 27 to lift the latter and disengage the notch 29 from the catch arm 30, the result of which is to free or unlock the safety valve locking means 27—30 thereby allowing the spring 21 or other power means to expand to automatically close the safety valve 17 thereby stopping the flow of gasoline thru inflow pipe 10 at the safety valve 17.

The safety float 32 and operating connections which corelate it with the safety valve 17 constitute a safety-control unit 32—17 which operates under the influence of the rising liquid in the chamber 6 and is adapted to move through a predetermined operating range. The leverage ratio of the safety valve control connections is such that the liquid level L may rise to a substantial height as shown in Figure 4 before the lock or catch-arm 30 is released from the latch 27. For this reason the safety-control unit 32—17 ordinarily does not function because under normal working conditions the gasoline normal-operating level L is maintained at the proper height by the normal-level-control unit 11—13. It is when the latter unit loses control of the gasoline level in the chamber that the safety unit 32—17 is called upon to act as shown in Figure 4.

While the normal-level-control unit 11—13 which is safeguarded by the safety-control unit 32—17, is generally sufficient under all circumstances to maintain the gasoline level L in the chamber 6 at a desirable and normal-operating level, there is nevertheless provided an additional safeguard by which to stop or remove from the gasoline in the inflow pipe 7 the pressure thereon required to convey the gasoline from the storage source to the chamber 6. This is accomplished by an electric circuit and switch means which will now be described.

Means is necessarily required to pump or convey or feed the gasoline from the source of supply, not shown, through the inflow pipe 10 into the chamber 6. Frequently this means is electrically operated as by a motor-driven pump or by a solenoid-valve-controlled hydraulic system. Frequently the latter is used because of its simplicity. One form of hydraulic system merely includes a water pipe 44, one end of which is connected with the city water main supply while the other end may connect with the bottom of a storage tank not shown, which is ordinarily underground. The flow of water through pipe 44 into an underground storage tank lifts or floats the gasoline out on top of the water and hence the gasoline is driven or lifted up through pipe 10 to chamber 6.

The water pipe 44 may be equipped with a magnetically-controlled or solenoid-actuated cut-off valve 40. This valve 40 may be opened by a solenoid 31 connected to a circuit 42. When the circuit 42 is closed, the solenoid 31 is energized and the cut-off valve 40 is opened as shown in Figures 1 and 2. On the other hand, when the solenoid is deenergized as by breaking the circuit 42 it follows that the water-cut-off valve 40 is automatically closed by power means such as a spring 46, by a weight or other automatic closing means. Therefore the circuit 42 and solenoid 31 produce a remote-control mechanism by which a water pipe 44 is opened and closed to force gasoline up through inflow pipe 10 and to stop the flow thereof and this remote-control means 42—31 in our invention is placed under the direct control of one or both of the floats 13 and 32. In the present example of the invention the electrically-controlled water-main valve 40 is placed under the control of the safety float 32.

A safety switch 41 is included in the circuit 42 and is coordinated with the safety valve 17 in such a way that the switch 41 is automatically opened to break the circuit 42 when the safety valve 17 is automatically closed by its spring 21 to close the inflow pipe 10. Likewise there is provided a normal-level-control switch 43 which is included in the circuit 42 and in this instance is coordinated with the safety float 32. As a matter of fact the normal-level-control switch 43 might as well be coordinated to work with the normal-level-control valve and float unit 11—13. Any suitable type of switching means may be used, it being an object to open the remote-control electric circuit 42 with the normal rise and fall of the liquid level to maintain the latter at a normal and desirable working level or hydrostatic head, and to also open the circuit when the liquid level L rises to an extreme or abnormal height as shown in Figure 4. In the latter instance both switches 41 and 43 are open thus making for a high degree of safety, since if one switch may fail to properly function, the other is to be relied upon. The switches are diagrammatic to illustrate the principle of the invention and it is noted that the switches 41 and 43 are connected in series with the circuit 42.

The safety switch may include a plunger 45 to open and close the switch blades 41 and a spring or other means 47 is used to normally urge the switch 41 toward open position to maintain the circuit 42 open or broken. The springs 21 and 47 operate at the same time and comprise power means to open the switch 41 and close the valve 19. A bell crank is connected through a link 49 to the handle 23 used to set open the safety valve 17. In this way the safety switch 41 is coordinated with the safety valve 17. When the attendant swings the handle 23 clockwise, the switch blades 41 are closed and held closed against the compressed spring 47 by the locking means 27—30. As a matter of fact the spring 21 in safety valve 17 and spring 47 in safety switch 41 act together as power means in their effort to automatically close the safety valve and open the safety switch. Therefore when the liquid level L rises to an abnormal height as in Figure 4, it follows that the float 32 causes the valve 17 to be closed automatically and the switch 41 to be opened automatically which in turn breaks the circuit 42 leading to the remote-controlled solenoid 31 thereby deenergizing the latter to allow the spring 46 to force the water-pipe cut-off valve 40 to closed position. The safety switch 41 normally remains closed during the well regulated and normal operation of the apparatus and is only called upon to open during such abnormal occurrence as the rise of the liquid level to an extreme height as shown in Figure 4.

On the other hand, the normal-level-control switch 43 is adapted to continuously or regularly open and close in the course of maintaining the liquid within the normal limits shown in diagram Figures 2 and 3. A plunger 52 carries one set of the switch blades 43 and a spring 53 tends to force the blades apart, thereby keeping the circuit 42 open except when the liquid level is at low-normal position as in Figure 2 where the switch 43 is held closed against spring 53. A bell crank 54 has one arm engaged against the switch plunger 52 and the other arm is operatively connected with the switch and valve control rod 36. The rod 36 may slide freely in the bell crank 54 and a collar 55 is fixed to the rod 36 above the bell crank so that as the rod moves downwardly under the influence of the receding gasoline level, it follows that the collar 55 engages the bell crank 54 which closes the switch blades 43 and thereby closes circuit 42 to energize solenoid 31 followed by opening water-pipe cut-off valve 40 and pipe 44 to run water into an underground storage tank and hence convey gasoline up through inflow pipe 7.

The above operation having been effected the gasoline now pours into the chamber 6 through valve mouth 12 and the floats begin to rise which slides rod 36 upwardly and in time disengages collar 55 from bell crank at the proper level as shown in Figure 3 whereupon the switch spring 53 opens switch blades 43 to break the circuit 42 and automatically close the water valve 40. Thus the cut-off valve 40, the normal-level-control valve 11 and normal-level-control switch 43 are all coordinated to work together to maintain a normal gasoline head as shown in Figures 1, 2 and 3. Furthermore, the cut-off valve 40, the safety valve 17 and safety switch 41 are all coordinated to protect the apparatus against over-filling to that position shown in Figure 4.

From the foregoing description, the general operation of the liquid supply apparatus will be understood that we again refer briefly to the diagrams. Note that Figure 2 shows a normal low-liquid level in the chamber 6 and in this position both switches 41 and 43 are closed so that the solenoid 31 is energized to open the water pipe 44 to refill the chamber 6 up to the level of Figure 3 position where the gasoline has risen high enough to open the normal-level-control switch 43 and hence stop the flow of gasoline. The normal-level-control valve 11 is now also closed but if for any reason it should leak and thus tend after a long period to cause the chamber 6 to overflow, it follows that the safety-control unit 32—17 will act to simultaneously open the safety switch 41, close safety valve 17, and deenergize solenoid 31 to close cut-off 40 thereby positively shutting off the inflow to the chamber 6 so that gasoline cannot rise beyond the level shown in Figure 4 where both switches are open and hence the apparatus will not again start functioning until an attendant closes the safety switch 41 and opens the safety valve 17.

This liquid supply system fills a need long felt by engine manufacturers and the like for use in laboratories and dynamometers and affords a positive gasoline supply.

What is claimed is:—

1. In a liquid supply system, a receiving chamber and inflow piping connected thereto, an electric circuit and a switch included therein, a valve and magnetic-operating means therefor and the circuit being connected to the magnetic-operating means to open the valve when the switch is closed, a float in the chamber and connections from the float to the switch, a second switch included in series in the circuit, a safety valve in the inflow pipe, means connecting the second switch with the safety valve whereby the switch opens as the valve closes, power means to actuate the second switch and safety valve, means retaining the power means from operating and connections from the float to the retaining means to release the power means when the liquid rises in the chamber above normal-operating level.

2. In a liquid supply system, a receiving chamber and inflow piping connected thereto, means to feed fluid to the receiving chamber, cut-off controlling the feeding means and power means to actuate the same, a circuit connected with the power means, a switch connected in the circuit, valve means in the inflow piping, float means controlled by the fluid level in the receiving chamber, connections between the float means and the valve means to close the latter and break its connection with the float means, and means controlled by the float means to open and close the switch.

3. In a liquid supply system, a cut-off valve and power means to work the same, a circuit connected with the power means, a plurality of switches connected in series to the circuit, a liquid receiving chamber in which a predetermined liquid level is required to be maintained and inflow piping connected thereto, a float in the chamber; means to move one switch to open and closed circuit position including, float-operated means actuated by the float when moving over a normal range to actuate the switch to one position; and means controlled by the float-operated means when the float moves beyond the normal range to operate another switch.

4. In a liquid supply system, a cut-off valve and power means to work the same, a circuit connected with the power means, a pair of switches connected in series in the circuit, a liquid receiving chamber in which a predetermined liquid level is required to be maintained and inflow piping connected thereto, a float in the chamber; means to move one switch to open and closed position including, float-operated means actuated by the float when moving over a normal range to move the switch to one position to operate the power means; means controlled by the float when the float moves beyond the normal range to operate the other switch, a safety valve mounted in the inflow piping and power means to automatically close the safety valve, and a lock-open device to hold the safety valve open against the last named power means, the float operated means being connected to the lock-open device to trip the latter when the float moves beyond its normal range as aforesaid.

5. In a liquid supply system, a receiving chamber, an inflow pipe connected thereto, a valve in the inflow pipe, means feeding liquid through the inflow pipe to the receiving chamber, means controlling the feeding means, a float mounted in the chamber and movable with the liquid level therein, a connection from the float to the valve whereby the valve is actuated in case the liquid level rises to a predetermined high level, a connection from the float to the controlling means for the feeding means whereby the controlling means is actuated causing feeding of liquid to the receiving chamber in case the level of liquid therein reaches a predetermined low level, and an interconnection between the valve and the controlling means rendering the latter inoperable upon actuation of the valve.

6. In a liquid supply system, a receiving chamber, an inflow pipe connected thereto, a valve in the inflow pipe, means feeding liquid through the inflow pipe to the receiving chamber, a valve controlling the feeding means, a float mounted in the chamber and movable with the liquid level therein, a connection from the float to the first mentioned valve whereby the valve is actuated and disconnected from control of the float in case the liquid level rises to a predetermined high level, a connection between the float and the controlling valve for the feeding means for actuating the latter to feed liquid to the receiving chamber in case the level of liquid therein reaches a predetermined low level, and an interconnection between the first mentioned valve and the controlling valve rendering the latter inoperative upon actuation of the first mentioned valve.

7. In liquid-supply apparatus, a receiving chamber and inflow pipe to convey liquid thereinto, a valve in the pipe, motor means to actuate the valve, latch means to restrain the motor means against motion whereby the valve is held to a predetermined set position, a float adapted to move through a predetermined operating range in the chamber to maintain the liquid at a normal-operating level, an operating connection from the float to the latch means to release the motor means for action to close the valve when the float moves out of the operating range aforesaid, an electric circuit and switches therein, means controlled by the circuit governing the inflow of liquid to the chamber, a connection from the float to one switch to open the latter when the float approaches the limits of the operating range and to also close the switch when the float moves back toward the normal-operating level, and operating connections between the float and another switch to positively open the latter switch when said float moves out of the operating range but not to close said latter switch until attended by an operator.

8. In float-controlled switch mechanism and the like for liquid-supply systems, a float movable up and down through a predetermined normal-operating range, an electric circuit, means controlled by the circuit governing the inflow of liquid to the chamber, switches connected therein, an operating connection from the float to one switch to open the latter when the float moves to the limits of its normal-operating range and to close the switch when the float returns; an operating means interconnected between the float and another switch not effective on this last named switch while the float moves within said limits of its normal-operating range, including means to positively open said last named switch when the float moves beyond said limits, and means holding said last switch open until closed by an operator.

9. In liquid-supply apparatus, a chamber and liquid conveying pipes connected thereto, a normally-open safety cut-off valve in one of the pipes, an electric circuit having switches in series therein, means controlled by the circuit governing the inflow of liquid to the chamber, a two-direction operating mechanism interconnecting the switches and valve whereby the valve is open when the switches are closed and the valve is closed when one of the switches is open, and operating means connected to the mechanism and being sensitive to a differential liquid flow in the pipes to actuate said mechanism to first open one switch and then open the other switch and close the valve when said differential flow occurs.

10. In liquid-handling apparatus, a piping system through which flows a liquid to be fed from a place of storage to a place of consumption, liquid-contacting means correlated with the piping system to detect a differential between the rate of feed and consumption but which is insensitive to a normal equality in rate of flow between the two, and a combined-valve and electrical means including a normal-operating switch and a safety switch to control the flow and being operatively connected with the liquid-contacting means whereby a slight differential in rate of flow in the piping system actuates the normal-operating switch but a greater differential in rate of flow actuates both the safety switch and valve.

CHARLES F. BECKWITH.
C. CURTIS MAIN.